M. S. CUMNER AND F. W. GEISSENHAINER.
SCREW THREAD GRINDING MACHINE.
APPLICATION FILED SEPT. 10, 1918.

1,412,778.

Patented Apr. 11, 1922.
6 SHEETS—SHEET 1.

Matthew S. Cumner & Inventors
Frederick W. Geissenhainer
By their Attorneys
Marshall & Dearborn M. S. CUMNER AND F. W. GEISSENHAINER.
SCREW THREAD GRINDING MACHINE.
APPLICATION FILED SEPT. 10, 1918.

1,412,778.

Patented Apr. 11, 1922.
6 SHEETS—SHEET 3.

Matthew S. Cumner
and Frederick W. Geissenhainer
Inventors
By their Attorneys
Marshall & Dearborn M. S. CUMNER AND F. W. GEISSENHAINER.
SCREW THREAD GRINDING MACHINE.
APPLICATION FILED SEPT. 10, 1918.

1,412,778.

Patented Apr. 11, 1922.

Matthew S. Cumner & Inventors
Frederick W. Geissenhainer
By their Attorneys
Marshall E. Dearborn

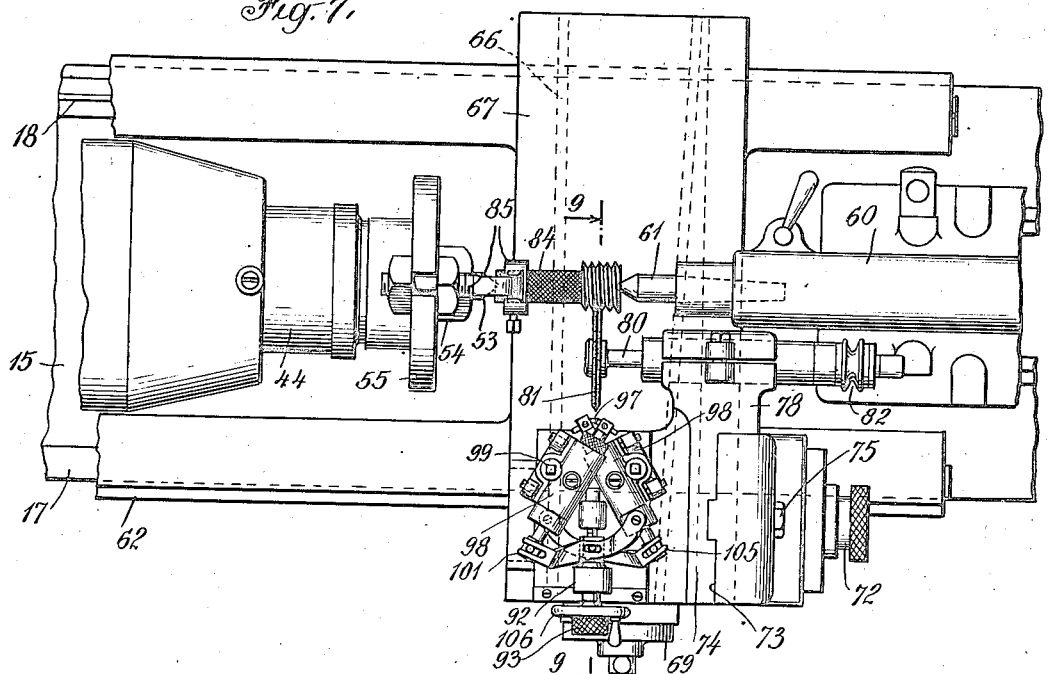
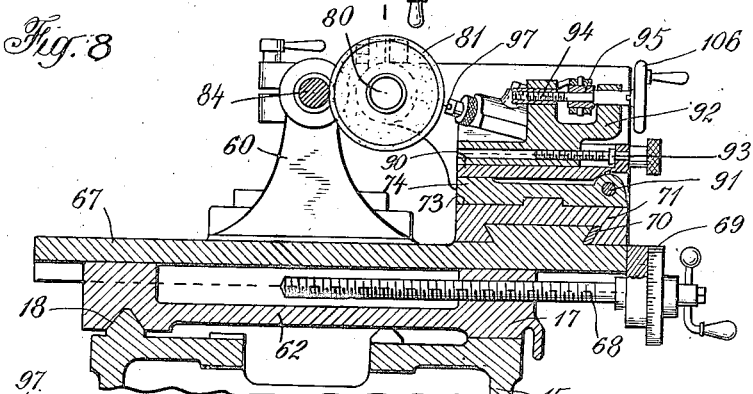
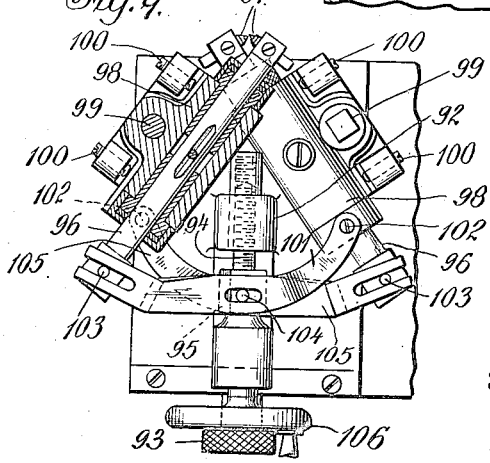

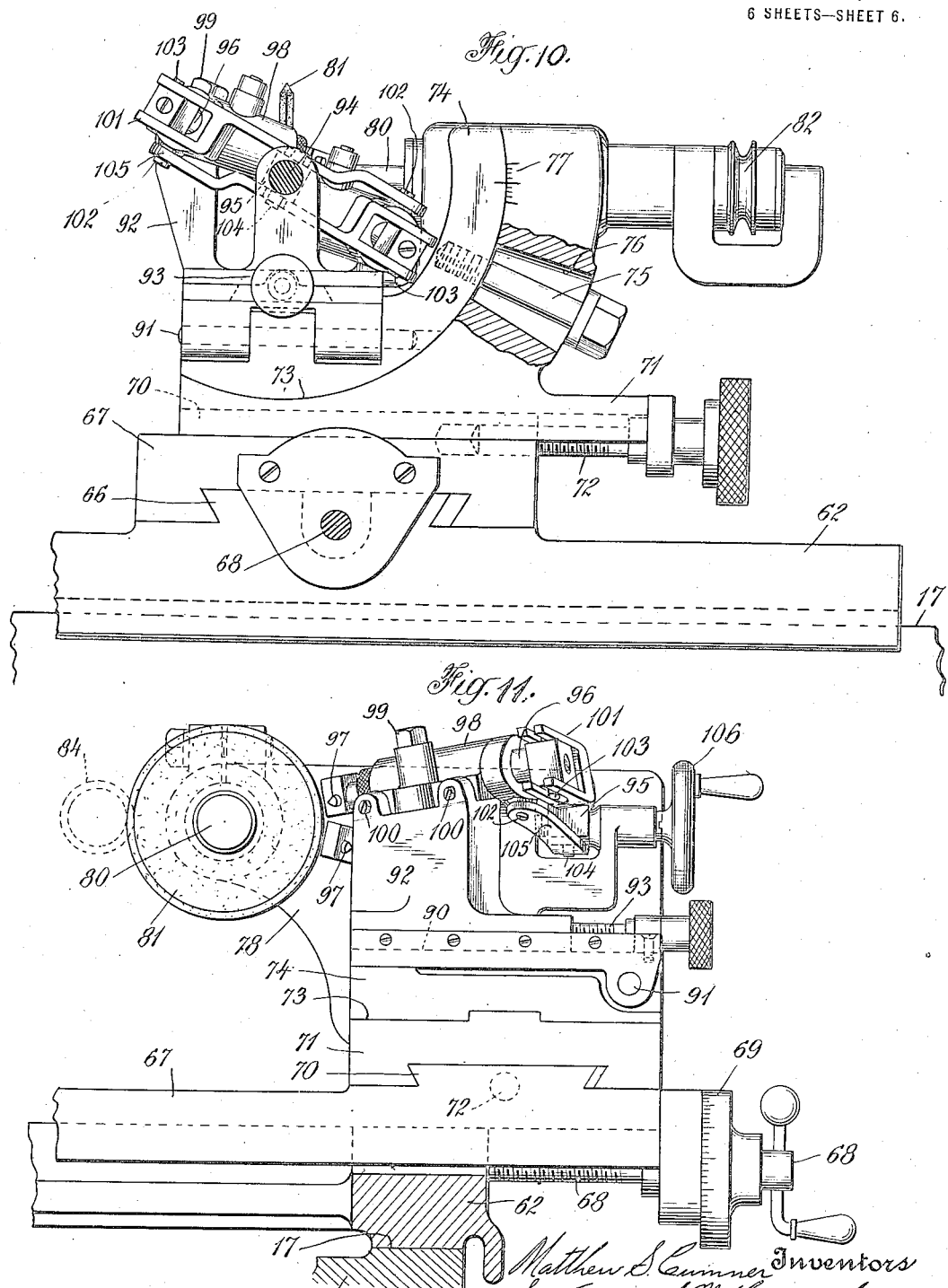

UNITED STATES PATENT OFFICE.

MATTHEW S. CUMNER, OF NEW YORK, N. Y., AND FREDERICK W. GEISSENHAINER, OF FREEHOLD, NEW JERSEY, ASSIGNORS TO NESTOR MANUFACTURING COMPANY, INC., OF NEW YORK, N. Y., A CORPORATION OF NEW YORK.

SCREW-THREAD-GRINDING MACHINE.

1,412,778.                    Specification of Letters Patent.    Patented Apr. 11, 1922.

Application filed September 10, 1918. Serial No. 253,394.

*To all whom it may concern:*

Be it known that we, MATTHEW S. CUMNER, a citizen of the United States of America, and a resident of New York, county and State of New York, and FREDERICK W. GEISSENHAINER, a citizen of the United States of America, and a resident of Freehold, Monmouth County, and State of New Jersey, have invented certain new and useful Improvements in Screw-Thread-Grinding Machines, of which the following is a specification, reference being had to the accompanying drawings, forming a part thereof.

Our invention relates to new and useful improvements in screw thread grinding machines, and its object is to provide a simple mechanism by means of which screw threads may be easily and quickly cut by an abrasive wheel.

Another object is to provide a machine in which the causes of inaccuracy in such mechanisms as have been known heretofore, shall be eliminated, so that threads may be ground thereon which approach perfection. The machine is therefore adapted to the use of making hardened master gages.

Another object is to so arrange the parts that the mechanism may be manipulated, adjusted and controlled, easily.

A still further object is to provide a simple and efficient arrangement for dressing the grinding wheel.

In order that our invention may be thoroughly understood, we will now proceed to describe the same in the following specification, and will then point out the novel features thereof in appended claims.

Referring to the drawings:

Figure 7 is a plan view of certain parts of the machine showing the grinding wheel trimmer.

Figure 8 is a sectional end elevation on the line 9—9 of Figure 7.

Figure 9 is a plan view of a trimmer with a part thereof shown in section.

Figure 10 is a front elevation of the trimmer and grinding wheel support.

Figure 11 is an end elevation of the trimmer and grinding wheel support.

Like characters of reference designate corresponding parts in all the figures.

Figure 1:
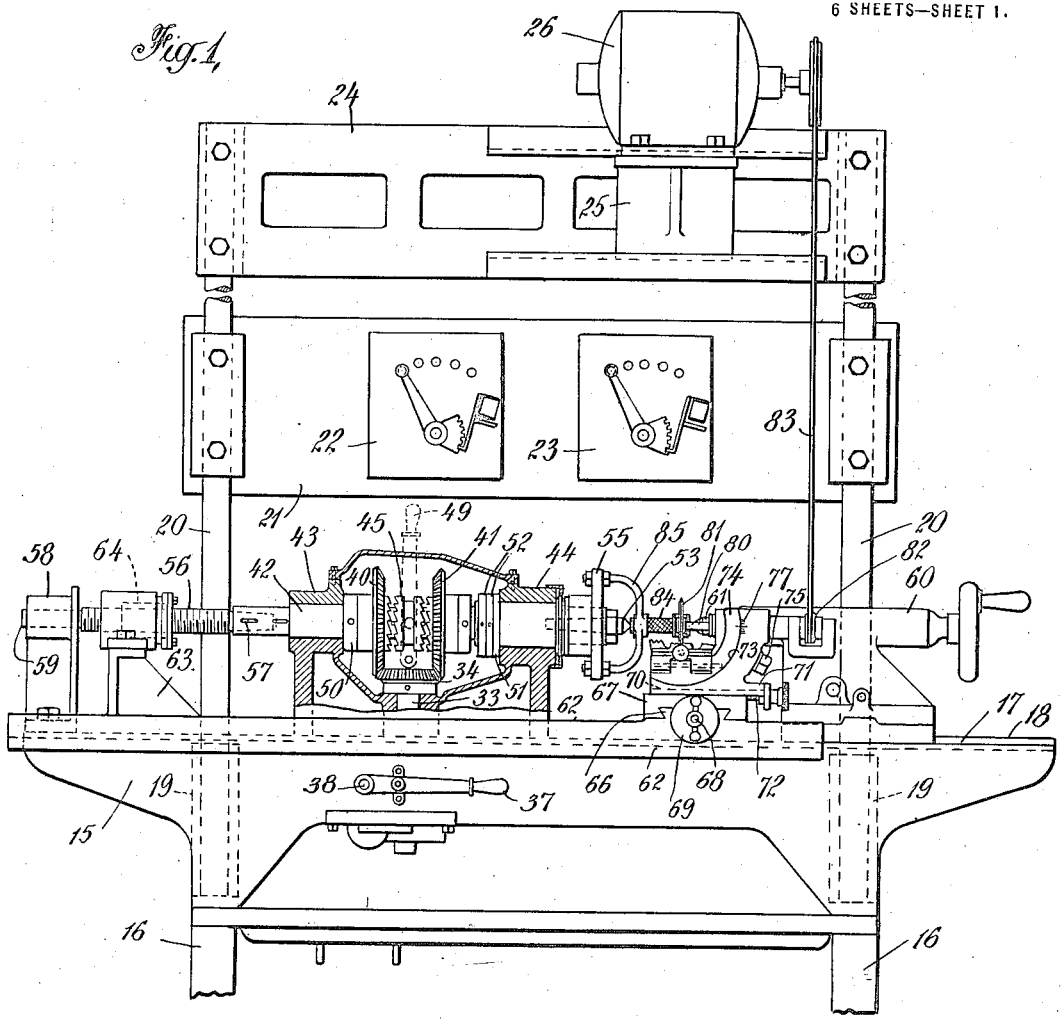
Figure 1 is a front elevation of a screw thread grinding machine which is made according to and embodies our invention.
Figure 2:
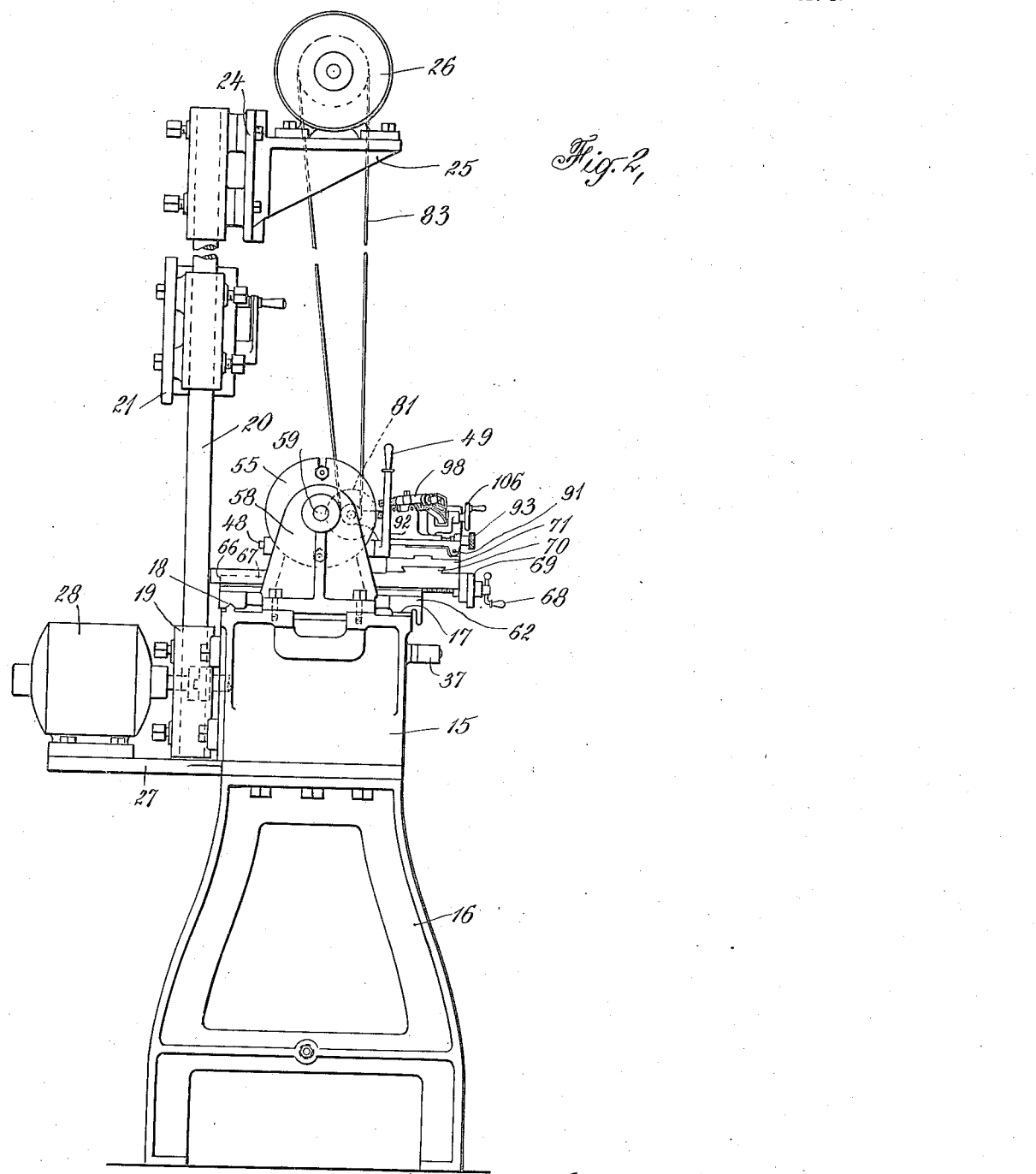
Figure 2 is a side elevation of the same apparatus.
Figure 3:
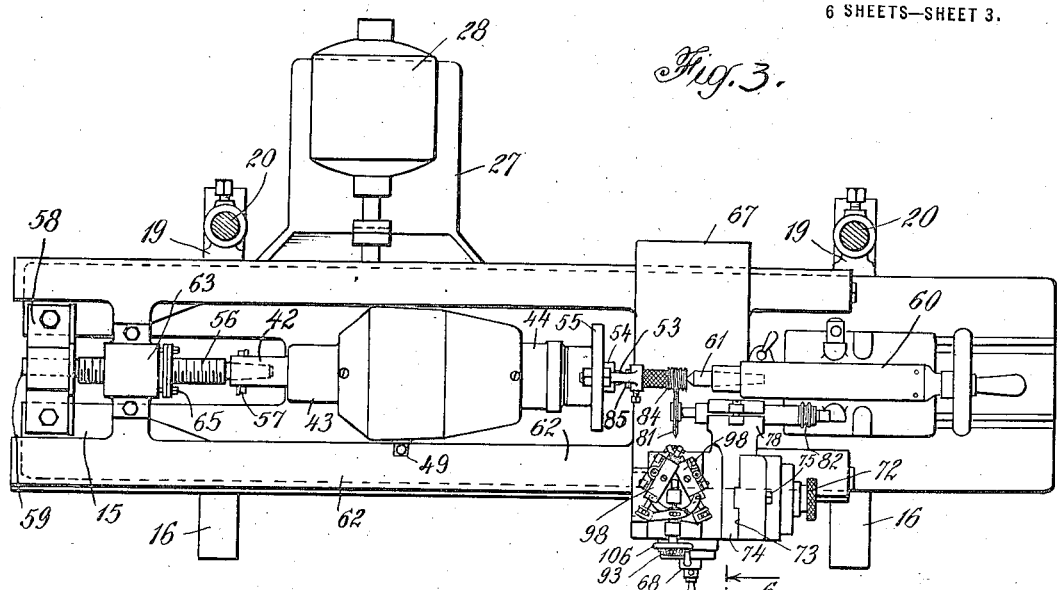
Figure 3 is a plan view of the machine shown in Figures 1 and 2 with the upper part removed.
Figure 4:
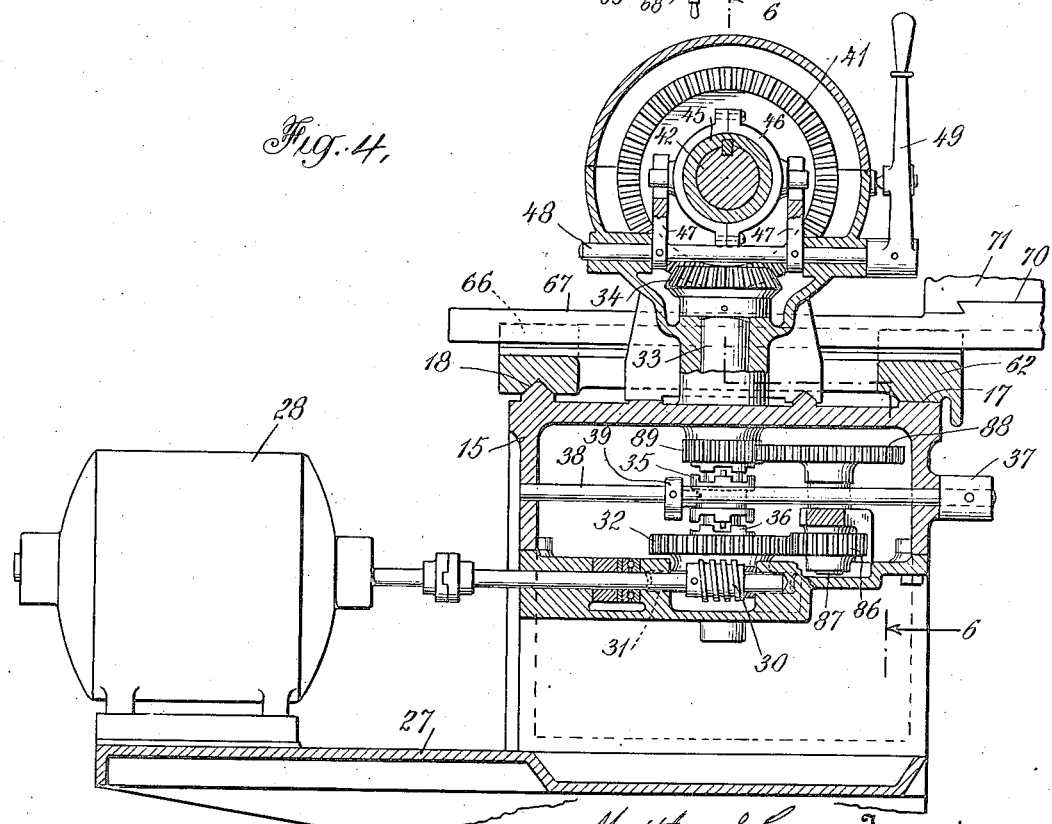
Figure 4 is a sectional end elevation, taken on the irregular line 5—5 of Figure 5, with the parts shown on a larger scale.
Figure 5:
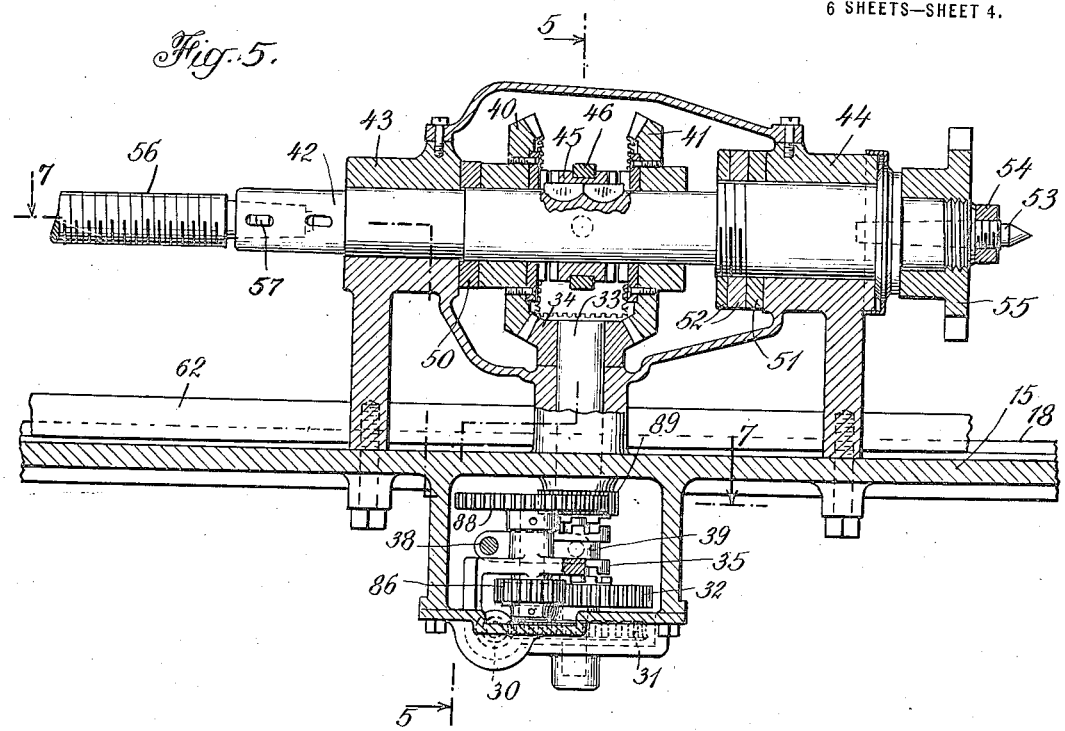
Figure 5 is a sectional elevation taken on the irregular line 6—6 of Figure 4.
Figure 6:
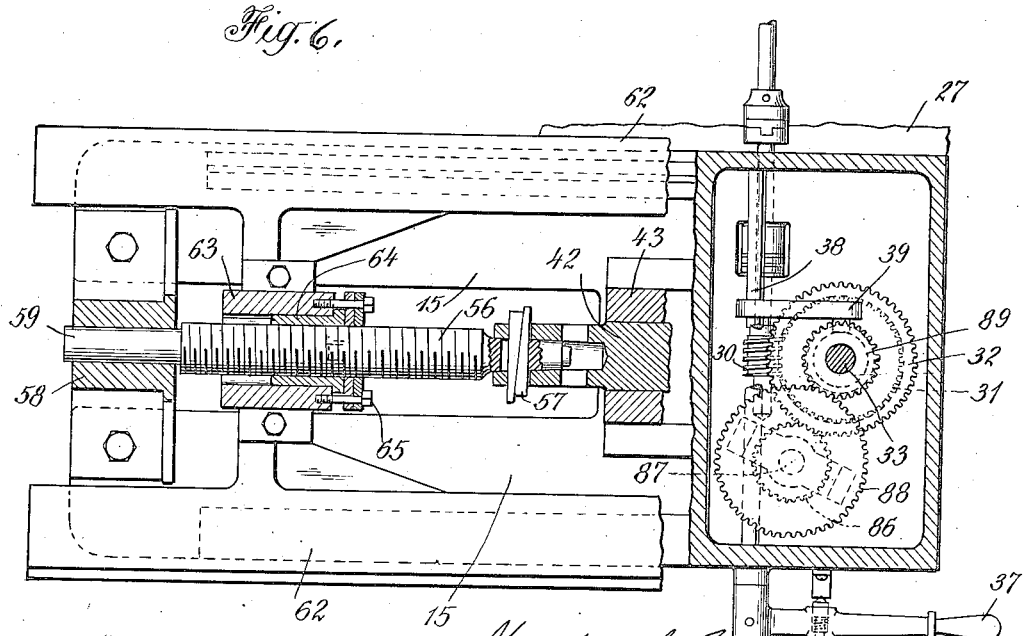
Figure 6 is a sectional plan view taken on the irregular line 7—7 of Figure 5.

15, designates the bed of the machine which is supported on legs 16. The bed is constructed to form two parallel rails 17 and 18, the first having a flat surface and the other being a V-rail. On the back of the bed are lugs 19 which support a pair of vertical rods 20 on which is a board 21 which carries motor controllers 22 and 23, and another board 24 on which is slidably mounted a bracket 25 which carries an electric motor 26. 27 is a bracket projecting from the back of the bed 15 which carries another electric motor 28.

The shaft of motor 28 is connected with a worm 30 which meshes with a worm gear 31 which is an integral part of a spur gear 32. This combined worm and spur gear is loosely mounted on a vertical shaft 33 to the upper end of which is affixed a bevel gear 34. 35 is a clutch member splined to shaft 33 and arranged when moved downwardly, to engage projections 36 on the upper side of gear 32 to make a driving connection therewith and to cause the shaft 33 to rotate with the gear 32.

The arrangement for moving the clutch member on the shaft comprises a lever 37 on a shaft 38 and another lever 39 having a pin which projects into a groove in the clutch member.

The bevel gear 34 is in mesh with two bevel gears 40, 41 loosely mounted on a horizontal shaft 42 in bearings 43, 44 affixed to the bed 15. The inner faces of these two bevel gears are provided with clutch projections which are arranged to be engaged by a clutch member 45 splined to shaft 42 between them. This clutch member carries a collar 46 from which project trunnions which are engaged by forked levers 47 affixed to a shaft 48 which may be rocked by a hand lever 49.

The shaft 42 is held against longitudinal movement by a thrust washer 50 between the gear 40 and bearing 43 and a thrust washer 51 between the gear 41 and bearing 44. The thrust washer 51 is adjustably positioned on shaft 42 by means of nuts 52 on a threaded portion of the shaft.

One end of shaft 42 is arranged to receive a tapered head center 53 on which is screwed a release nut 54. 55 is a slotted face plate screwed onto this end of the shaft 42.

The other end of shaft 42 is provided with a tapered hole to receive the end of a screw 56 which is driven into tight engagement therewith by means of a pair of tapered keys 57. 58 is a bracket affixed to the bed 15 which forms a bearing for a cylindrical end 59 of the screw 56.

60 is an adjustable tail stock affixed to the bed 15 and arranged to support a tail center 61.

62 is a frame slidably mounted on the tracks 17 and 18. A bracket 63 carries a nut 64 which fits the screw 56. This nut is affixed to the bracket by bolts 65.

On the slidable frame 62 is a transverse track 66 on which is adjustably mounted a transversely movable carriage 67 which may be moved in or out on the track by a screw 68 on which is a michrometer adjusting disc 69. This carriage has a track 70 parallel with the rails 17 and 18 on which is mounted a longitudinally movable carriage 71, the position of which on the carriage 67 may be adjusted by a screw 72.

The upper surface of the carriage 71 forms a semicylindrical ribbed base 73. 74 is a table which fits this base and is secured thereto by a bolt 75, which passes through a slot 76 in the carriage 71 into the table 74. 77 designates graduations which show the relative position of the table on its base. A bracket 78 projecting from the rear of the table 74 forms bearings for a shaft 80, on one end of which is the grinding wheel 81 and on its other end a small grooved pulley 82 which is connected by a belt 83 with the motor 26.

Before more specifically describing other features of the mechanism shown in the drawings, we will describe the operation of this machine.

An article such as a thread gage 84 is placed between the head center 53 and the tail center 61 and connected by a dog 85 with the face plate 55 so as to rotate in unison with the shaft 42. The motor 28 is started and its speed regulated by the controller 22 which is conveniently located in front of the operator. By lowering lever 37 the shaft of this motor is connected with the vertical shaft 33 to drive the gears 40 and 41 in opposite directions. When the lever 49 is moved to one side or the other it will cause the shaft 42 to be rotated in one direction or the other to rotate the gage 84.

At the same time the screw 56 will be given a corresponding rotation which will move the nut 64 and the sliding frame 62 longitudinally. The grinding wheel 81 is on this sliding frame so that it will move across the gage 84 at a rate exactly proportional to the pitch and rate of rotation of the screw 56. Consequently by the manual adjustments of the wheel it may be made to cut a thread on the gage 84 of the same pitch as that of the screw 56, but of any desired diameter. By the use of this machine threads of practically perfect pitch may be ground. The threads are preferably rough cut on the gages by usual methods and the gages hardened before they are ground on this machine.

The screw 56 is removable and others of other pitches with corresponding nuts 64 are substituted when gages of different pitch are to be ground. The gage shown in the drawings is one with an external thread but of course the same machine may be used for grinding internal threads. This only entails the usual well known expedient of holding the gage on the end of shaft 42 by means of a chuck instead of between head and tail centers.

If the pitch of the thread to be ground is steep, it is sometimes desirable to tilt the grinding wheel. This is accomplished by loosening the bolt 75 and moving the table 74 on its base, the axis of the curvature of which is normal to the axis of shaft 80.

It is sometimes desirable to drive the shaft 42 at a higher rate relative to that of the motor. In order to accomplish this the gearing which we will now describe is provided.

A pinion 86 affixed to a vertical shaft 87 is in mesh with gear 32. A gear 88 also on shaft 87 is in mesh with a pinion 89 rotatably mounted on the shaft 33. On the lower surface of the pinion 89 are clutch projections with which the clutch member 35 engages when the lever 37 is raised from its central position. When this is done the rate of rotation imparted to the shaft 33 is greater than that of the gear 32 so that shaft 42 is driven faster. When grinding is done during only such times as the frame 62 is moving in one direction, it is desirable to provide for a quick return of the frame. This is accomplished by the manipulation of the lever 37 or if desired may be done automatically.

One of the essentials to the grinding of perfect threads is that the cutting surfaces of the grinding wheel be in good condition and at an angle corresponding with the angle between the sides of the finished thread. To insure this we have devised the wheel trimmer which is illustrated in detail in Figures 7-11.

90 is a base pivotally connected at 91 to the table 74. This carries a frame 92 which slides in and out on the base, its position being adjusted by means of a screw 93. The frame forms bearings for another adjusting screw 94 on which is a traveling nut 95. Cutter slides 96 on each of which are diamond cutters 97, are mounted in housings 98 pivoted to the frame 92 at 99. 100 are adjusting screws for varying the angularity of these housings. 101 designates a forked lever which is pivoted at 102 to one of the housings 98 with its other end slotted to engage a pin 103 on the opposite cutter slide 96 and with intermediate slots through which project pins 104 on the nut 95. 105 is a similar forked lever oppositely mounted to engage the other cutter slide.

By rotating the screw 94 by the wheel 106 the two cutter slides are moved inwardly, on opposite sides of the grinding wheel 81 to trim its cutting surfaces. The cutter slides may be moved in and back again quickly and their positions relative to the wheel adjusted by the screw 93.

When the wheel 81 is being used to grind inside threads, the trimming mechanism as a whole may be swung back out of the way about the pivot 91 after each trimming operation without disturbing its adjustments.

It is to be noted that the trimmer is mounted on the same table as the grinding wheel, so that when the grinding wheel is tilted the trimmer is tilted with it.

The machine so far described in detail is arranged to move the grinding wheel along the piece to be ground. It is necessary to have the proper relative movement between these parts but it is not necessary to give the grinding wheel any other movement than its rotation.

Structures of preferred form and construction have been illustrated and described for the purpose of showing ways in which this invention may be used, but the inventive thought upon which this application is based is broader than these illustrative embodiments thereof, and we therefore intend no limitations other than those imposed by the appended claims.

What we claim is:

1. A thread grinding machine comprising a rotary shaft, means for attaching thereto a piece to be ground, a screw affixed to the shaft, a slidable frame guided to move parallel with the shaft, a nut on the frame in engagement with the screw, a grinding wheel, and a support therefor on the slidable frame.

2. A thread grinding machine comprising a rotary shaft, means for attaching thereto a piece to be ground, a screw detachably affixed to the shaft in alignment therewith, a slidable frame guided to move parallel with the shaft, a nut detachably affixed to the frame in engagement with the screw, a grinding wheel, and an adjustable support therefor on the slidable frame.

3. A thread grinding machine comprising a motor, a rotary shaft, means for attaching thereto a piece to be ground, reversing gearing between the motor and the shaft, a screw affixed to the shaft in alignment therewith, a slidable frame guided to move parallel with the shaft, a nut affixed to the frame in engagement with the screw, a grinding wheel, and a support therefor on the slidable frame.

4. A thread grinding machine comprising a motor, a rotary shaft, means for attaching thereto a piece to be ground, reversing gearing between the motor and the shaft, a screw detachably affixed to the shaft in alignment therewith, a slidable frame guided to move parallel with the shaft, a nut detachably affixed to the frame in engagement with the screw, a grinding wheel, and an adjustable support therefor on the slidable frame.

5. A thread grinding machine comprising a motor, a rotary shaft, means for attaching thereto a piece to be ground, gearing between the motor and the shaft for driving the shaft at different speeds, manual means for controlling the driving gearing, reversing gearing connected with the shaft, manual means for controlling the reversing gearing, a screw detachably affixed to the shaft in alignment therewith, a slidable frame guided to move parallel with the shaft, a nut detachably affixed to the frame in engagement with the screw, a grinding wheel, and an adjustable support therefor on the slidable frame.

6. A thread grinding machine, comprising a rotary shaft member carrying a screw in alignment therewith, a slidable frame member guided to move parallel with the shaft member, a nut on the frame member in engagement with the screw, a grinding wheel supported on one of said members and means for attaching the work to be ground to the other of said members and in position to be operated on by the grinding wheel.

7. A thread grinding machine, comprising a rotary shaft, means for attaching thereto a piece to be ground, a screw affixed to the shaft, a slidable frame guided to move parallel with the shaft, a nut on the frame in engagement with the screw, a carriage transversely adjustable on the frame, a longitudinally adjustable carriage on said transverse adjustable carriage, a table having an arcuate adjustment on said longitudinally adjustable carriage and a grinding wheel mounted on said table.

8. A thread grinding machine, comprising a rotary shaft, a screw carried by said shaft, a slidable frame guided to move parallel with the shaft, a nut on said frame in engagement with the screw, transversely and longitudinally adjustable carriages mounted in superposed relation on the frame, a table mounted for arcuate adjustment on the upper of said carriages and a grinding wheel on said table.

9. A thread grinding machine, comprising a rotary shaft, a screw carried by said shaft, a slidable frame guided to move parallel with the shaft, a nut on said frame in engagement with the screw, transversely and longitudinally adjustable carriages mounted in superposed relation on the frame, a table mounted for arcuate adjustment on the upper of said carriages, a grinding wheel on said table, a wheel trimming device also mounted on the table and bodily adjustable with the grinding wheel and means for independently adjusting the grinding wheel and trimming device relative to each other.

In witness whereof, we have hereunto set our hands this 6th day of September, 1918.

MATTHEW S. CUMNER.
FREDERICK W. GEISSENHAINER.